United States Patent
Diethorn et al.

(10) Patent No.: US 9,306,852 B2
(45) Date of Patent: Apr. 5, 2016

(54) CODING AND PACKET DISTRIBUTION FOR ALTERNATIVE NETWORK PATHS IN TELECOMMUNICATIONS NETWORKS

(75) Inventors: Eric John Diethorn, Long Valley, NJ (US); Bengi Karacali-Akyamac, Bridgewater, NJ (US); Mark John Karol, Fair Haven, NJ (US); Anjur Sundaresan Krishnakumar, Rocky Hill, NJ (US); Parameshwaran Krishnan, Basking Ridge, NJ (US); Jean Meloche, Madison, NJ (US)

(73) Assignee: Avaya Inc., Basking Ridge, NJ (US)

( * ) Notice: Subject to any disclaimer, the term of this patent is extended or adjusted under 35 U.S.C. 154(b) by 1980 days.

(21) Appl. No.: 11/342,193

(22) Filed: Jan. 27, 2006

(65) Prior Publication Data
US 2007/0177579 A1 Aug. 2, 2007

(51) Int. Cl.
| | |
|---|---|
| *H04L 12/725* | (2013.01) |
| *H04L 5/06* | (2006.01) |
| *H04L 29/06* | (2006.01) |
| *H04L 12/811* | (2013.01) |
| *H04L 12/801* | (2013.01) |
| *H04L 12/707* | (2013.01) |

(52) U.S. Cl.
CPC ............... *H04L 47/10* (2013.01); *H04L 45/24* (2013.01); *H04L 45/302* (2013.01); *H04L 47/38* (2013.01)

(58) Field of Classification Search
CPC ..... H04W 40/02; H04L 65/60; H04L 1/0026; H04L 1/0002; H04L 65/80
USPC ........................................................ 370/229
See application file for complete search history.

(56) References Cited

U.S. PATENT DOCUMENTS

| | | | | |
|---|---|---|---|---|
| 5,565,924 | A * | 10/1996 | Haskell et al. | 348/423.1 |
| 6,026,097 | A * | 2/2000 | Voois et al. | 370/468 |
| 6,061,405 | A * | 5/2000 | Emami | 375/260 |
| 6,785,262 | B1 * | 8/2004 | Yao et al. | 370/352 |
| 6,885,658 | B1 * | 4/2005 | Ress | H04L 12/66 370/352 |
| 7,209,590 | B2 * | 4/2007 | Lee et al. | 382/232 |
| 2002/0006137 | A1* | 1/2002 | Rabenko et al. | 370/466 |
| 2002/0114332 | A1* | 8/2002 | Apostolopoulos | H04L 29/06 370/392 |
| 2002/0163935 | A1* | 11/2002 | Paatela | H04L 29/06 370/466 |
| 2003/0033425 | A1* | 2/2003 | Deshpande | 709/233 |
| 2003/0035553 | A1* | 2/2003 | Baumgarte et al. | 381/94.2 |
| 2003/0112821 | A1* | 6/2003 | Cleveland | H04L 1/0002 370/468 |

(Continued)

OTHER PUBLICATIONS

Wang et al., Wireless Video Transport Using Path Diversity: Multiple Description Vs. Layered Coding, Department of Electrical and Computer Engineering Polytechnic Univ.

*Primary Examiner* — Asad Nawaz
*Assistant Examiner* — Jason Harley (57) ABSTRACT

A method and apparatus are disclosed that seek to improve the quality of service that is experienced during the transmission of a stream of packets across one or more paths. In particular, a transmitting node encodes a source stream of data (e.g., audio, video, etc.) into one or more sub-streams, and distributes those sub-streams onto multiple network transmission paths. In accordance with the illustrative embodiment of the present invention, the transmitting node evaluates the quality of service of a first network path that fails to provide a quality-of-service guarantee. When the quality of service of the first network path becomes unsatisfactory, the coding of one or more sub-streams that are being transmitted on a second network path is adjusted. In other words, the coding on a second channel is adjusted in response to the changing conditions on a first channel.

19 Claims, 9 Drawing Sheets

(56) References Cited

U.S. PATENT DOCUMENTS

| | | | |
|---|---|---|---|
| 2003/0169755 A1* | 9/2003 | Ternovsky | 370/412 |
| 2003/0210909 A1* | 11/2003 | Rowan et al. | 398/43 |
| 2003/0231655 A1* | 12/2003 | Kelton | H04N 7/17318 370/468 |
| 2004/0076229 A1* | 4/2004 | Ishikawa | 375/240.01 |
| 2004/0199662 A1* | 10/2004 | Karol et al. | 709/238 |
| 2004/0267503 A1 | 12/2004 | Batterberry et al. | |
| 2005/0007262 A1* | 1/2005 | Craven | G11B 20/00992 341/50 |
| 2005/0035553 A1* | 2/2005 | Lehrer | G07F 17/32 273/444 |
| 2005/0117641 A1* | 6/2005 | Xu et al. | 375/240.08 |
| 2005/0163093 A1* | 7/2005 | Garg et al. | 370/342 |
| 2005/0185578 A1* | 8/2005 | Padmanabhan et al. | 370/229 |
| 2007/0058548 A1* | 3/2007 | Babonneau et al. | 370/235.1 |

* cited by examiner

CODING AND PACKET DISTRIBUTION FOR ALTERNATIVE NETWORK PATHS IN TELECOMMUNICATIONS NETWORKS

FIELD OF THE INVENTION

The present invention relates to telecommunications in general, and, more particularly, to determining how to encode and transmit the data that is sent via a communications channel in a network, based on the quality of service of the network.

BACKGROUND OF THE INVENTION

Figure 1:
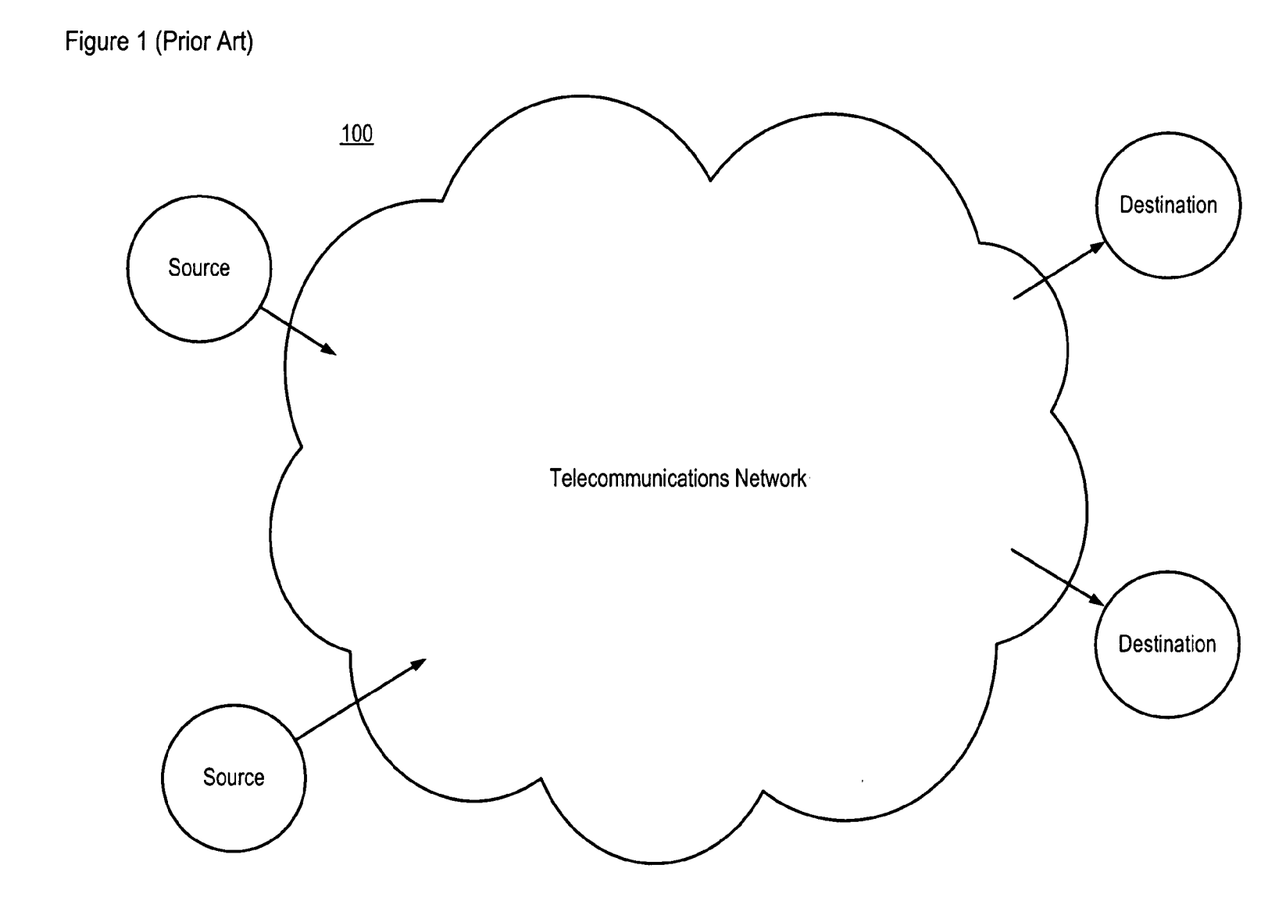
FIG. 1 depicts a schematic diagram of a telecommunications network in the prior art, such as the Internet, which transports data packets from one node to another.

FIG. 1 depicts a schematic diagram of a telecommunications network in the prior art, such as the Internet, which transports data packets from one node to another. When each node in the network can be both a source of packets and a destination, there are k(k−1) network paths through the network, wherein k is positive integer that represents the number of nodes in the network. For the purposes of this specification, a "network path" is defined as the physical route between a pair of source and destination nodes in a network.

The service provided by a network path is characterized by its "quality of service," which, for the purposes of this specification, is defined as a function of the bandwidth, error rate, and latency from one node to another. For the purposes of this specification, the "bandwidth" from one node to another is defined as an indication of the amount of information per unit time that can be transported from the first node to the second. Typically, bandwidth is measured in bits or bytes per second. For the purposes of this specification, the "error rate" from one node to another is defined as an indication of the amount of information that is corrupted as it travels from the first node to the second. Typically, error rate is measured in bit errors per number of bits transmitted or in packets lost per number of packets transmitted. For the purposes of this specification, the "latency" from one node to another is defined as an indication of how much time is required to transport information from one node to another. Typically, latency is measured in seconds.

Some applications—for example, e-mail—are generally more tolerant of the quality of service provided by the network path, but some other applications—particularly telephony, and streaming audio and video—are generally very sensitive. While some network paths provide quality-of-service guarantees, many others, including most of those through the Internet, do not. The result is that the provisioning of applications like telephony through the Internet can require transmitting some packets of a given packet stream across one network path and transmitting other packets of the same stream across another network path, in order to maintain the required or preferred quality of service level. The result is that the provisioning of applications like telephony through the Internet can be problematic.

A network path is subject to various kinds of degradation in the quality of service. Degradation can be sudden, in which one moment the quality of service is excellent and the next moment the quality of service is poor. A sudden degradation can occur, for example, when a transmission cable is cut or a router malfunctions. Degradation can also be gradual, in which the quality of service starts out good, then becomes fair, possibly for an extended period, then eventually becomes unsatisfactory. A gradual degradation can occur, for example, when one or more nodes in a network path start to become congested.

Multiple path transport (also known as path or route diversity) schemes have been proposed for telecommunications networks to achieve increased quality of service and reliability. In multiple path transport (MPT), multiple paths are established between a source node and a destination node, and the transmitted packet stream is split up and transmitted via the established multiple paths. However, the use of multiple path transport does not, by itself, guarantee that a stream of packets will experience a satisfactory quality of service.

The need exists, therefore, for an invention that improves the overall quality of service that is experienced during the transmission of a stream of packets.

SUMMARY OF THE INVENTION

The present invention provides a technique to improve the overall quality of service (QoS) that is experienced during the transmission of a stream of packets across one or more paths, without some of the disadvantages in the prior art. In particular, a transmitting node (i) encodes a source stream of data (e.g., audio, video, etc.) into one or more sub-streams, and (ii) distributes or replicates those sub-streams onto multiple network transmission paths. In accordance with the illustrative embodiment of the present invention, the transmitting node evaluates the quality of service of a first network path that fails to provide a quality-of-service guarantee. When the quality of service of the first network path becomes unsatisfactory, the coding of one or more sub-streams that are being transmitted on a second network path is adjusted. In other words, the coding on a second communications channel is adjusted in response to changing conditions on a first communications channel. Such an encoding technique can reduce or even eliminate the glitches that a user perceives during the transitions from using one network path to another when the channel quality deteriorates.

The source node in the illustrative embodiment encodes the source stream of data by either encoding the source stream into a single, self-contained sub-stream or into multiple sub-streams. G.711 coding and G.726 coding are two examples of single sub-stream encoding. After producing a single sub-stream of encoded data, the source node can then replicate the sub-stream across multiple sub-streams to be transmitted across one or more network paths. Alternatively, the source node instead produces a plurality of sub-streams, in which at least one sub-stream has a dependence on another sub-stream either to improve the reconstruction quality (at the destination node) or to guarantee a basic level of reconstruction quality. Two techniques for this type of source coding are "multi-descriptive coding" and "layered coding." Both techniques produce multiple sub-streams that can be transmitted on separate paths. With multi-descriptive coding (also known as "multiple description coding"), each sub-stream, which is also referred to as a "description," can guarantee a basic level of reconstruction quality at the destination node; using additional sub-streams can further improve the quality. In contrast, with layered coding, only the base-layer sub-stream can guarantee a basic level of reconstruction quality at the destination node; the enhancement-layer sub-streams alone are not useful, but can further improve the quality when combined with the base-layer sub-stream.

In accordance with the illustrative embodiment of the present invention, the source node is able to change how it encodes a source stream of data into one or more sub-streams, based on evaluating one or more network paths between the source node and the destination node. For example, if the quality of service of a first network path becomes unsatisfactory, the source node can change the encoding of the source stream to compensate with the encoded sub-stream or sub-streams that are transmitted via a second network path. The quality of service in the example can further deteriorate on the first network path, which prompts a further change in the encoding used in conjunction with the sub-streams transmitted on the second network path, or the quality of service on the first network path can become satisfactory again, which prompts yet another change in the encoding.

In addition, the source node distributes or replicates, among the available network paths, the packets from the different encoded sub-streams. As a first example, a first network path might correspond to a network path through a network that is able to guarantee a quality of service—in which case, the source node might choose to route a sub-stream of critical packets to the QoS-guaranteed network path. As a second example, the source node might route the packets from two encoded sub-streams through a first path and a second path, respectively, in a network that does not guarantee quality of service. As a third example, the source node might route all of the packets from two encoded sub-streams to the same network path. By adjusting the distribution of the sub-streams, as well as the encoding of those sub-streams, the system of the illustrative embodiment advantageously mitigates congestion in the transmission network, instead of merely displacing the congestion.

Some of examples provided in this summary are of how a second network path is affected by the changing conditions on a first network path, in accordance with the illustrative embodiment of the present invention. However, it will be clear to those skilled in the art, after reading this specification, how to apply embodiments of the present invention towards affecting a second set of multiple network paths based on the changing QoS conditions within a first set of multiple network paths, where the first and second sets might or might not be overlapping.

The illustrative embodiment of the present invention comprises evaluating the quality of service of a first network path from a first node to a second node through a third node that is not in a second network path, wherein the first network path fails to provide a quality-of-service guarantee; transmitting a first portion of a stream of packets on the second network path from the first node to the second node through a fourth node that is not in the first network path, wherein the first portion comprises a first sub-stream of encoded data at a first encoded data rate; and when the quality of service of the first network path is unsatisfactory, transmitting a second portion of the stream of packets on the second network path, wherein the second portion comprises a second sub-stream of encoded data at a second encoded data rate.

DETAILED DESCRIPTION

The following terms are defined for use in this Specification, including the appended claims:
   The term "source stream," and its inflected forms, is defined as the unencoded, raw data stream of packets that is provided by an information source.
   The term "sub-stream," and its inflected forms, is defined as the encoded data stream of packets that is the output of an encoder.
   The term "transmitted stream," and its inflected forms, is defined as the data stream of packets that is transmitted by a source node.

Figure 2:
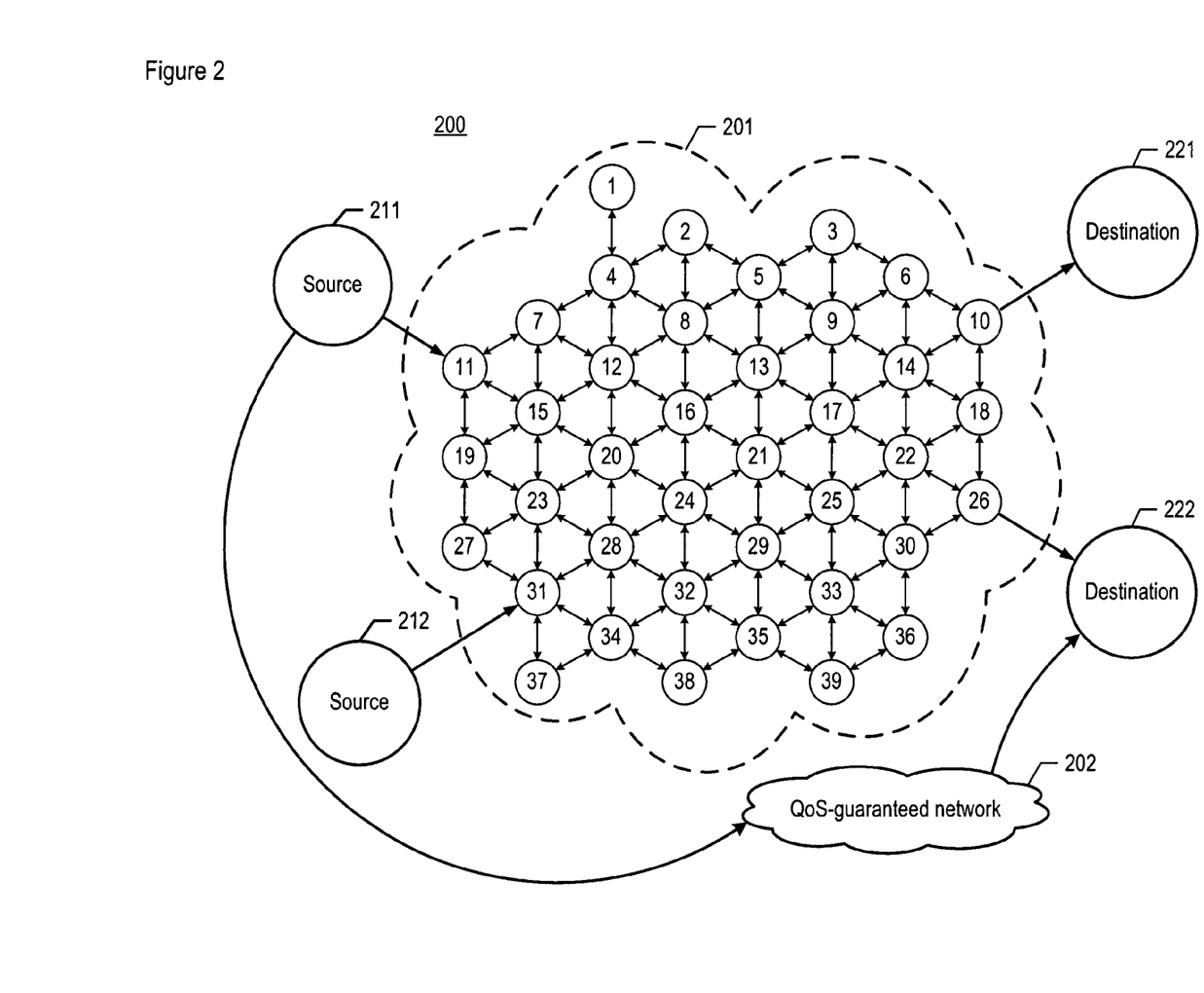
FIG. 2 depicts a schematic diagram of the salient components of telecommunications system 200 in accordance with the illustrative embodiment of the present invention.

FIG. 2 depicts a schematic diagram of the salient components of telecommunications system 200 in accordance with the illustrative embodiment of the present invention. System 200 comprises source nodes 211 and 212, destination nodes 221 and 222, and networks 201 and 202, interconnected as shown. FIG. 2 also depicts the physical resources that compose network 201.

Network 201 does not provide a quality-of-service guarantee to any packet or stream of packets such as Real-time Transport Protocol (RTP) packets, as is known in the art, that it transports, for example, from source node 211 to destination node 222. Therefore, the provisioning of real-time services such as streaming audio and telephony, from a source node to a destination node, is problematic without the present invention.

Network 201 comprises a plurality of nodes and their physical interconnections, arranged in the topology shown. It will be clear to those skilled in the art, however, after reading this specification, how to make and use alternative embodiments of the present invention with networks that comprise any number of nodes and have any topology. In particular, it will be clear to those skilled in the art, after reading this specification, how to make and use embodiments of the present invention with the Internet.

Each node in network 201 is capable of receiving a packet and of forwarding that packet to another node, in well-known fashion, based on the destination address in the packet. For example, when node 11 receives a packet from source node 211, which packet contains node 26 as its destination address, node 11 must decide which of its adjacent nodes—nodes 7, 15, and 19—to forward the packet to.

Each node in network 201 decides which adjacent node to give each packet to based on: (1) the destination address in the packet, and (2) a routing table in the node. Table 1 depicts a routing table for node 11 in accordance with the illustrative embodiment of the present invention.

TABLE 1

Routing Table for Node 11

| Destination node Address | Preferred Next Node | First Alternative Next Node | Second Alternative Next Node |
|---|---|---|---|
| 1 | 7 | 15 | 19 |
| 2 | 7 | 15 | 19 |
| 3 | 7 | 15 | 19 |
| ... | ... | ... | ... |
| 26 | 15 | 7 | 19 |
| ... | ... | ... | ... |
| 37 | 19 | 15 | 7 |
| 38 | 19 | 15 | 7 |
| 39 | 19 | 15 | 7 |

When all of the resources in the network are functioning and there is little network congestion, each node forwards a packet to the preferred next node listed in the routing table. For example, when node 11 receives a packet with the destination address 26, the preferred next node is node 15. Each node forwards a packet to the node listed as the entry for the preferred next node and the packet progresses from one preferred next node to the next and the next and so on until it reaches its destination node.

In contrast, when the preferred next node is not functioning or there is congestion at the preferred next node, the routing node can alternatively route the packet to the first alternative next node. For example, the first alternative next node at node 11 for a packet with the destination address 26 is node 7. And when the first alternative node is not functioning or there is congestion at the first alternative next node, the routing node can route the packet to the second alternative next node. The second alternative next node at node 11 for a packet with the destination address 26 is node 19.

It is also possible for a source node such as node 211 to determine or influence the network path that is used to transport a stream of packets, as opposed to strictly leaving it to the routing tables to determine the path of each packet. As described below and with respect to FIG. 6, node 211 is able to specify at least one intermediate node in network 201 through which to transmit a stream of packets to a destination node, in accordance with the illustrative embodiment of the present invention. Node 211 might want to change network paths, for example, when the quality of service on a network path currently being used becomes unsatisfactory.

Network 202 is able to provide a quality-of-service guarantee to any packet or stream of packets (e.g., RTP packets, etc.) that it transports, in accordance with the illustrative embodiment. For example, network 202 can transport packets from source node 211 to destination node 222 with a quality-of-service guarantee. A source node such as source node 211 might select network 202 to transport at least some packets for applications that require those packets to be received successfully by the destination node. One example is a video streaming application that compresses the source stream by using layered coding, as is known in the art; in layered coding, the base-layer sub-stream must be received to guarantee a basic level of reconstruction quality. It will be clear to those skilled in the art how to make and use network 202 to provide a quality-of-service guarantee.

Figure 3A:
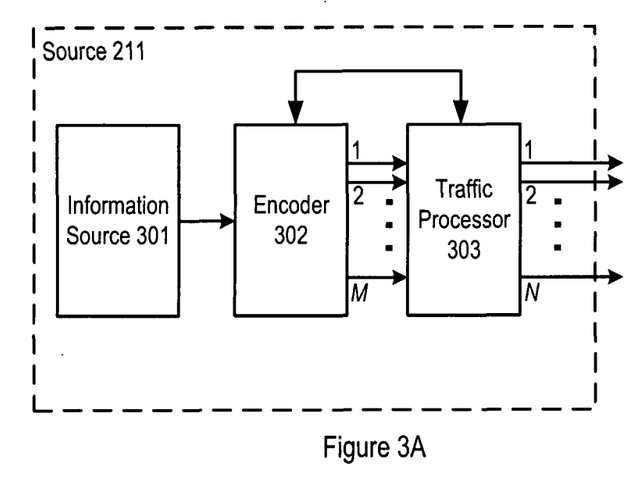
FIGS. 3A and 3B depict the salient components of source node 211 and destination node 222, respectively, in accordance with the illustrative embodiment of the present invention.

FIG. 3A depicts the salient components of source node 211, in accordance with the illustrative embodiment of the present invention. Source node 211 comprises information source 301, encoder 302, and traffic processor 303, interconnected as shown.

Information source 301 provides an application's source stream of data that is to be encoded and routed to a selected destination node. The application can be, but is not limited to, telephony, streaming audio, streaming video, email, and instant messaging. The originating source of the information that is available to source 211 can be a camera, a telecommunications terminal, a computer file, and so forth. It will be clear to those skilled in the art how to make and use information source 211 to provide a source stream of data.

Encoder 302 is a general-purpose processor that is capable of (i) receiving a source stream of data from information source 301, (ii) exchanging control information with traffic processor 303, (iii) source encoding the received information into M sub-streams (wherein M is a positive integer), and (iv) transmitting the encoded sub-streams to traffic processor 303. Encoder 302 is also capable of executing at least some of the tasks that are described below and with respect to FIGS. 8 and 9. In some alternative embodiments of the present invention, encoder 302 might be a special-purpose processor. In either case, it will be clear to those skilled in the art, after reading this specification, how to make and use encoder 302. Note that encoder 302, along with traffic processor 303, is further described below and with respect to FIG. 4.

Traffic processor 303 (i) receives control information and encoded sub-streams from encoder 302, and (ii) transmits, across N network paths (wherein N is a positive integer), signals that represent the sub-streams to other nodes via networks 201 and 202, in well-known fashion. Traffic processor 303 is also capable of executing at least some of the tasks that are described below and with respect to FIGS. 8 and 9. It will be clear to those skilled in the art, after reading this specification, how to make and use traffic processor 303.

Figure 3B:
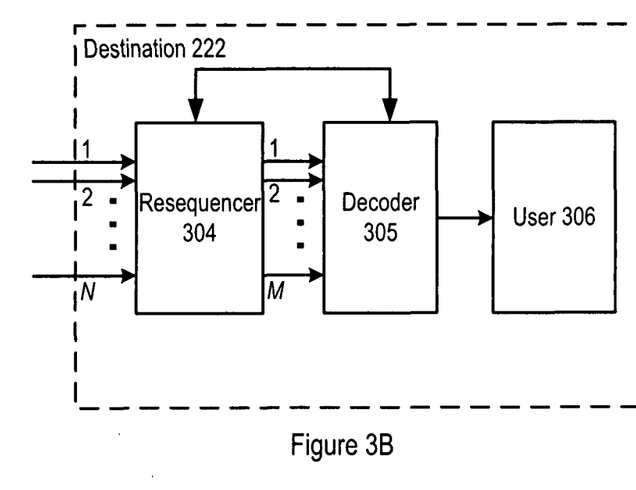

FIG. 3B depicts the salient components of destination node 222, in accordance with the illustrative embodiment of the present invention. Destination node 222 comprises resequencer 304, decoder 305, and user 306, interconnected as shown. User 306 is a device (e.g., a display, a telecommunications terminal, a computer, etc.) that uses the received information.

Resequencer 304 (i) receives, via N network paths, signals from other nodes via networks 201 and 202, (ii) resequences the information encoded in the signals into M sub-streams with the packets within each sub-stream in the proper order, and (iii) forwards the sub-streams to decoder 305, in well-known fashion. It will be clear to those skilled in the art, after reading this specification, how to make and use resequencer 304.

Decoder 305 is a general-purpose processor that is capable of (i) exchanging control information with resequencer 304 (ii) receiving sub-streams from resequencer 304, (iii) decoding the received sub-streams into a single packet stream that represents a reconstructed version of the original source information, and (iv) transmitting the reconstructed information to user 306. In some alternative embodiments of the present invention, decoder 305 might be a special-purpose processor. In either case, it will be clear to those skilled in the art, after reading this specification, how to make and use decoder 305.

Figure 4:
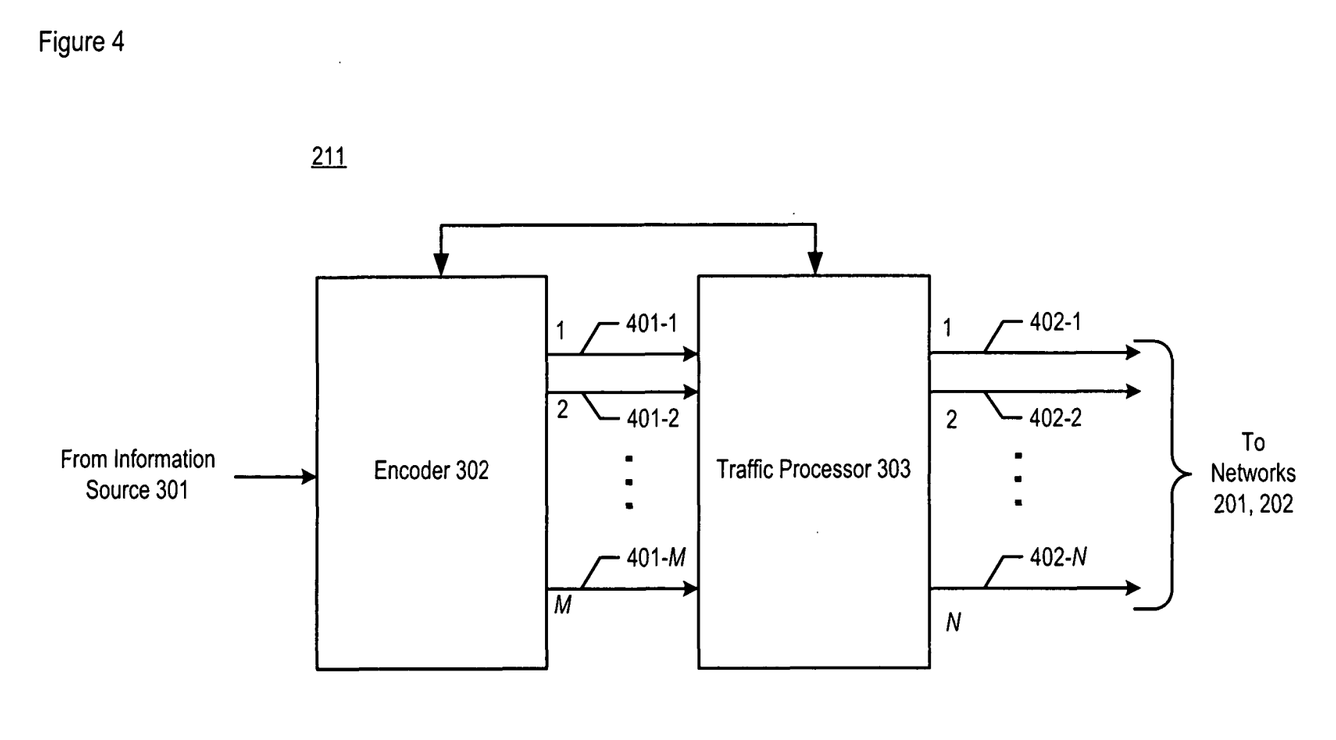
FIG. 4 depicts encoder 302 and traffic processor 303, in accordance with the illustrative embodiment of the present invention.

FIG. 4 depicts encoder 302 and traffic processor 303, in accordance with the illustrative embodiment of the present invention, along with encoded sub-stream paths 401-1 through 401-M and transmitted stream paths 402-1 through 402-N. In accordance with the illustrative embodiment, encoder 302 receives a source stream of data from information source 301.

Encoder 302 then encodes the received source data by using one of at least two methods. In the first method of encoding the received source data, encoder 302 produces essentially a single sub-stream of encoded data that is not intended to be combined with any other sub-stream in the decoding process. Two examples of this type of source coding are G.711 coding and G.726 coding, which are well-known in the art. The single sub-stream can be then replicated across multiple sub-streams to be transmitted across one or more network paths. As those who are skilled in the art will appreciate, either encoder 302 or traffic processor 303 can replicate the single sub-stream into multiple sub-streams. Alternatively, encoder 302 can produce at least one sub-stream of encoded data according to a first encoding process, at least one sub-stream of encoded data according to a second encoding process, and so forth, where each set of sub-streams is independent of the other sets with respect to the decoding process using by decoder 305.

In the second method, encoder 302 uses source coding to produce a plurality of sub-streams, in which at least one sub-stream has a dependence on another sub-stream either to improve the reconstruction quality (at the destination node) or to guarantee a basic level of reconstruction quality. Two techniques for this type source coding are "multi-descriptive coding" (MDC) and "layered coding" (LC). Both techniques produce multiple sub-streams that can be transmitted on separate paths. With multi-descriptive coding (also referred to as "multiple description coding"), each sub-stream, which is also referred to as a "description," can guarantee a basic level of reconstruction quality at decoder 305; additional sub-streams can further improve the quality. In contrast, with layered coding, only the base-layer sub-stream can guarantee a basic level of reconstruction quality at decoder 305; the enhancement-layer sub-streams alone are not useful, but can further improve the quality when combined with the base-layer sub-stream.

In accordance with the illustrative embodiment of the present invention, encoder 302 is able to change how it encodes a source stream of data into one or more sub-streams, based on evaluating one or more network paths between source node 211 and the destination node (i.e., destination node 222).

Traffic processor 303 receives the one or more encoded sub-streams from encoder 302 and distributes the packets from the different encoded sub-streams among the available network paths. As a first example, path 402-1 might correspond to a network path through network 202—in which case, traffic processor 303 might choose to route a base-layer sub-stream received from path 401-1 to path 402-1. As a second example, traffic processor 303 might route the packets from encoded sub-streams received on paths 401-2 and 401-3 to paths 402-2 and 402-3, respectively. As a third example, traffic processor 303 might route all of the packets from encoded sub-streams received on paths 401-4 and 401-5 to path 402-4.

In accordance with the illustrative embodiment of the present invention, traffic processor 303 is able to change how it distributes and specifies the routing of one or more encoded sub-streams, based on evaluating one or more network paths between source node 211 and the destination node (i.e., destination node 222). A first illustrative sequence of how the routing of a stream of packets might change, based on the changing conditions in network 201, is described below and with respect to FIGS. 5 through 7. In the sequence, one or more nodes experience congestion that gradually increases, which can occur through an overloading of the system by other traffic between other endpoint node pairs (e.g., source node 212 and destination node 221, etc.). A gradual degradation is in contrast to congestion that abruptly occurs, which can happen as the result of a cable being cut or an equipment malfunction.

Figure 5:
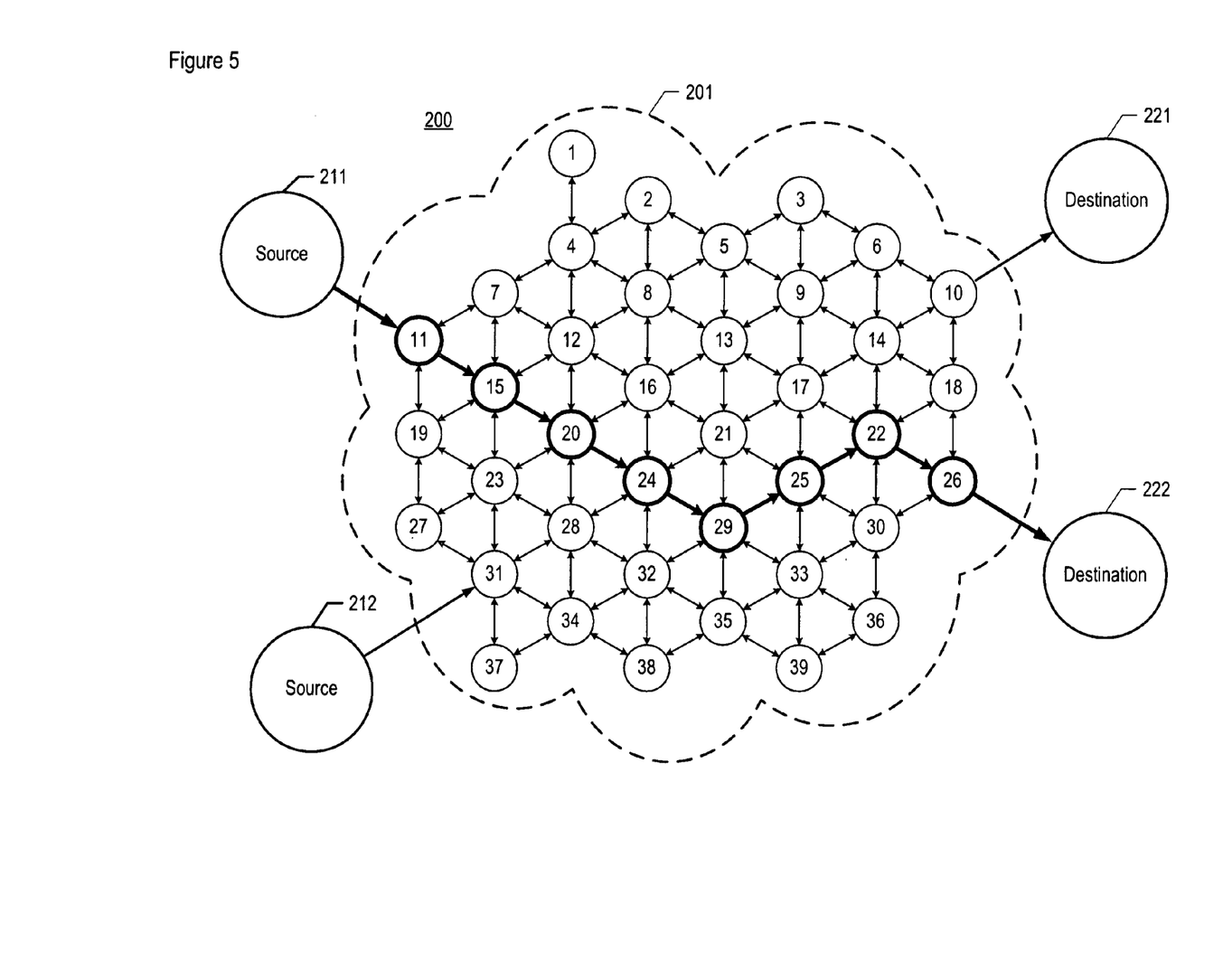
FIG. 5 depicts a nominal path that is used to transport a stream of packets through network 201 from source node 211 to destination node 222.

FIG. 5 depicts a nominal path that is used to transport a stream of audio packets through network 201 from source node 211 to destination node 222. The path is considered "nominal" because it is a chain of either (i) preferred next nodes or (ii) preferred and alternative next nodes from the source node to the destination node, as described above and with respect to Table 1. The nominal path used in this particular example comprises nodes 11, 15, 20, 24, 29, 25, 22, and 26. As those who are skilled in the art will appreciate, source node 211 alternatively could have specified a different network path (i.e., through an intermediate "relay" node) to transport initially the stream of packets in the example, as opposed to letting network 201 determine the path exclusively. The stream of packets includes an encoded sub-stream, where the encoding is in accordance with the G.711 protocol, which features µ-law pulse-code modulation (PCM) at 64 kilobits per second (kbps). As those who are skilled in the art will appreciate, however, the encoding alternatively can be in accordance with a protocol other than G.711.

While it transmits the stream of packets through the network path being used, source node 211 evaluates the network path to determine if the quality of service is satisfactory or not. In some alternative embodiments, a different node than the source node evaluates the quality of service of the network path. As part of the evaluating, node 211 has to acquire quality-of-service information for the network path. As is well known to those skilled in the art, the quality of service of a network path is measured by:

i. bandwidth, or
    ii. error rate, or
    iii. latency, or
    iv. a derivative or associated function of bandwidth, or
    v. a derivative or associated function of error rate (e.g., packet loss, etc.), or
    vi. a derivative or associated function of latency (e.g., jitter, etc.), or
    vii. any combination of i, ii, iii, iv, v, and vi.

It will be clear to those skilled in the art how source node 211 can acquire quality-of-service information for the path being evaluated.

In some embodiments, source node 211 also acquires quality-of-service information for other network paths, such as an alternative path through node 3, for example. For example, node 211 might evaluate the quality of service of other paths to see if the quality of service of a candidate path is more advantageous than that of a path in use.

Figure 6:
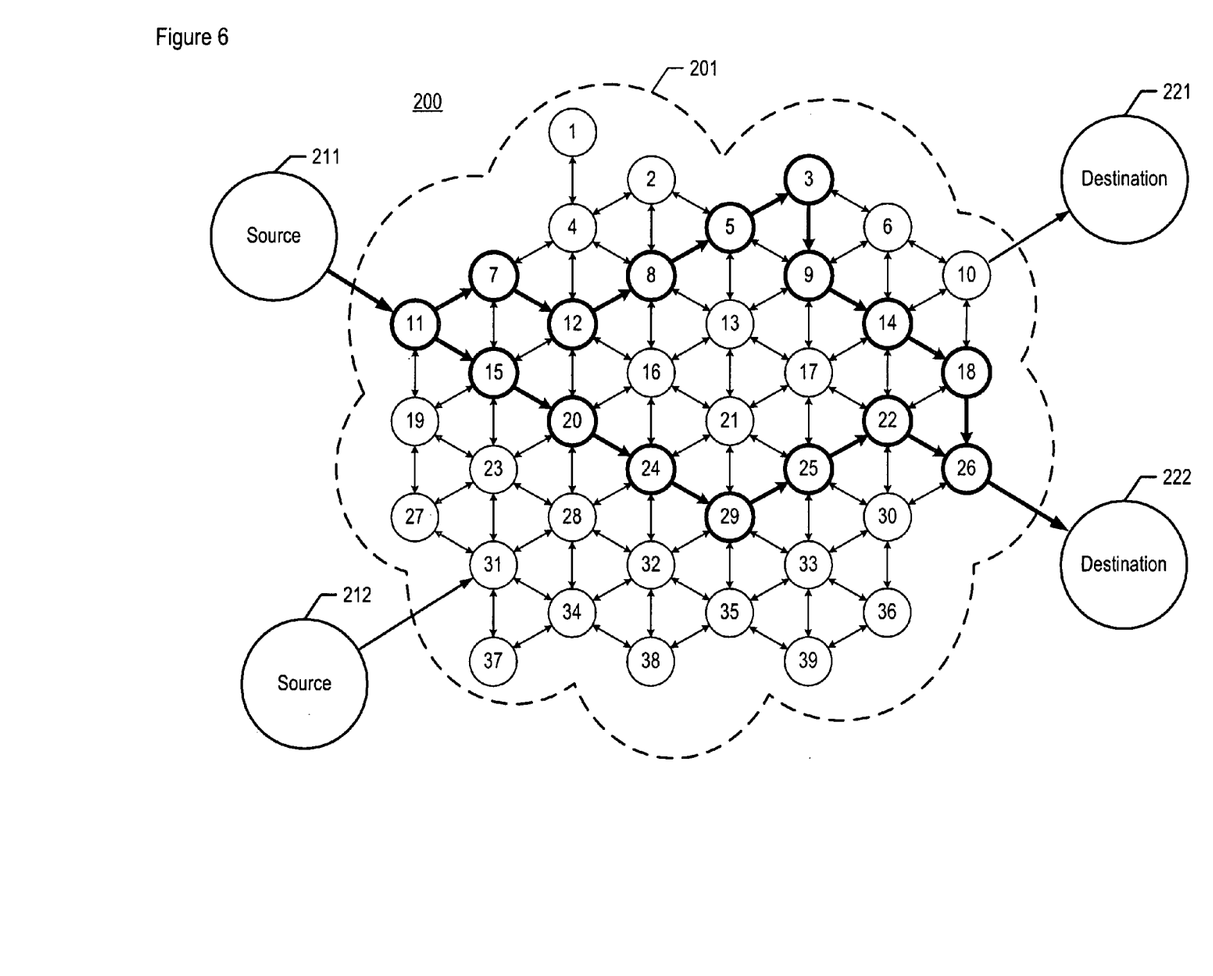
FIG. 6 depicts the use of an alternative network path through node 3 to transport some or all packets of a stream of packets that leave source node 211 for destination node 222, in addition to using the nominal path.

FIG. 6 depicts the use of an alternative network path through node 3 to transport some or all packets of a stream of packets that leave source node 211 for destination node 222, in addition to using the nominal path shown in FIG. 5. Node 211 has determined by evaluating the nominal path's quality of service that one or more of the nodes in the path are not functioning or are experiencing congestion. Node 211 can specify, by specifying an intermediate node, that at least some of the packets be rerouted onto an alternative path, in which case network 201 routes the packets on a path from source node 211 to node 3 and then on a path from node 3 to destination node 222. Source node 211 does not necessarily control the paths that the packet takes to node 3 and from node 3 to destination node 222. For example, source node 211 can specify node 3 in the packet's path but leave the routing decisions up to the nodes in network 201 that are in between nodes 211 and 3 and in between nodes 3 and 222. However, it is not necessary for source node 211 to specify every node in the alternative network path, as long as node 211 specifies one or more nodes (e.g., node 3, etc.) whose inclusion in a path provides a known quality of service.

As part of the shift depicted in FIG. 6 towards using the alternative network path, node 211 might also change the encoding used by encoder 302. Specifically, when node 211 determines that the quality of service of the nominal path has become unsatisfactory, encoder 302 in the example changes the encoding to the G.726 protocol, which features Adaptive Differential Pulse Code Modulation (ADPCM) at 32 kilobits per second, as well as other rates. As those who are skilled in the art will appreciate, however, encoder 302 can alternatively change the encoding to. a different rate within the G.726 protocol or change to a different encoding entirely than G.726. Note that the encoded data rate for G.726 is less than that of G.711 described with respect to FIG. 5. Because of the change in encoding, node 211 produces and transmits (i) a first 32-kbps sub-stream along the nominal path to node 222 and (ii) a second 32-kpbs sub-stream, which is a replication of the first sub-stream, along the alternative path through node 3 to node 222. In accordance with the illustrative embodiment, node 211 in the present example manages the consumed network bandwidth by transmitting two sub-streams each at 32 kbps instead of the one sub-stream at 64 kbps.

Figure 7:
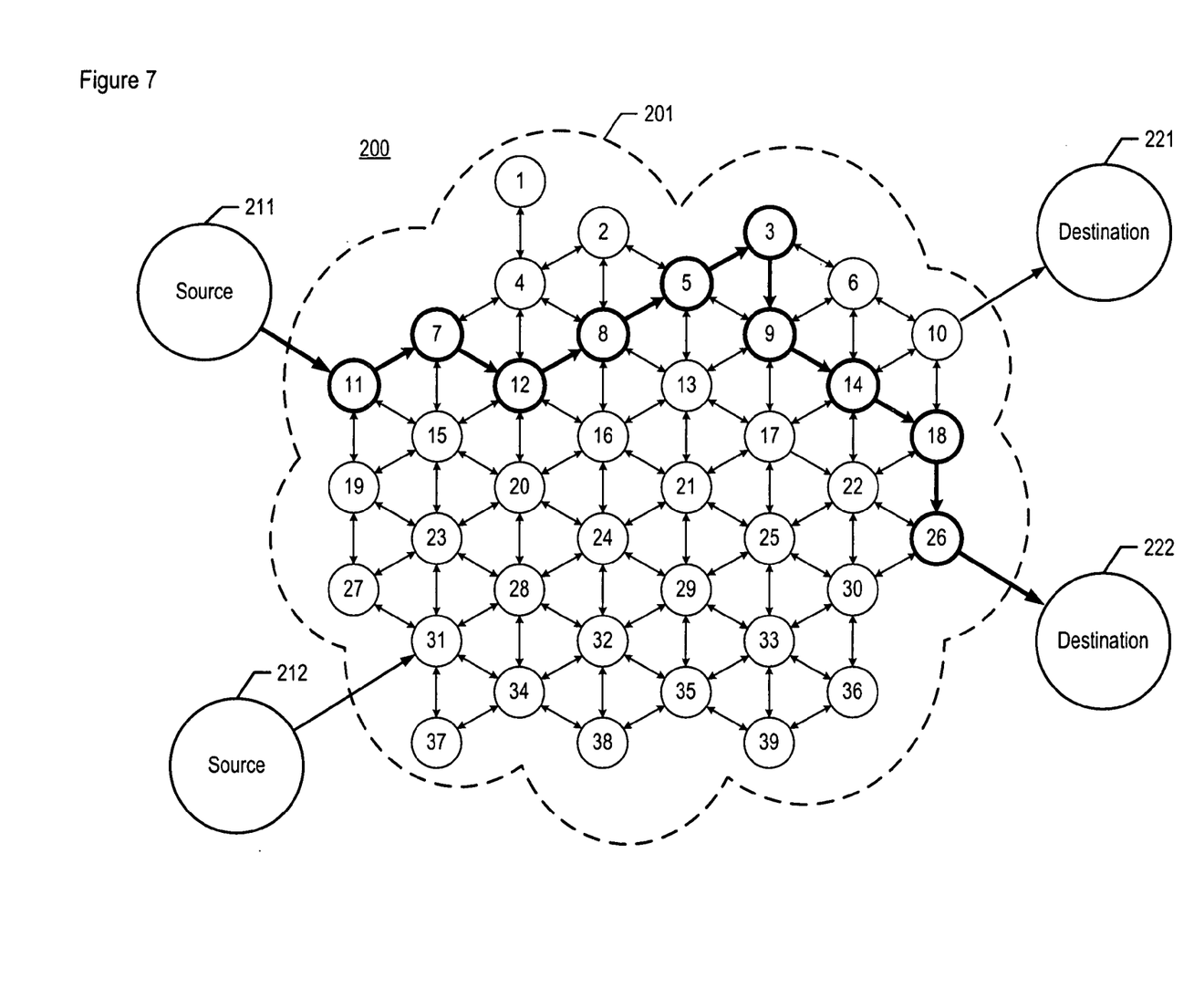
FIG. 7 depicts the use of an alternative network path through node 3 to transport all of the packets of a stream of packets that leave source node 211 for destination node 222.

FIG. 7 depicts the use of the alternative network path-through node 3 to transport all of the packets of a stream of packets that leave source node 211 for destination node 222. At this point in the depicted sequence of packet flows, the quality of service has degraded so much that the nominal path is no longer useful to the transaction. Node 211 stops transmitting the one 32 kilobit-per-second sub-stream on the nominal path. However, as node 211 is already also transmitting the other 32 kilobit-per-second sub-stream on the alternative path through node 3, the break in the transmitting along the nominal path is unapparent to user 306. Node 211 decreases the overall data rate of the stream of packets from the 64 kbps data rate of the sub-stream in FIG. 5 to the 32 kbps data rate of each of the two sub-streams in FIG. 6 to the 32 kbps data rate of the single sub-stream in FIG. 7. By decreasing the overall data rate in the process of changing the network paths, node 211 mitigates the shifting of a congestion bottleneck from one network path to another, in accordance with the illustrative embodiment Alternatively, in some embodiments, node 211 might again change the encoding used by encoder 302. For example, when node 211 stops using the nominal path as in FIG. 7, encoder 302 might change the encoding back to G.711, which has a greater encoded data rate than the G.726 encoder used in FIG. 6. As those who are skilled in the art will appreciate, the encoding alternatively can change to something other than G.711.

In a second illustrative sequence, which uses FIGS. 6 and 7 only, source node 211 transmits a stream of packets to destination node 222, in which a source stream of data is multi-descriptive-coded into M encoded sub-streams. For illustrative purposes, M is equal to two; however, as those who are skilled in the art will appreciate, M can have a different positive integer value. The nominal path (i.e., consisting of nodes 11, 15, 20, and so forth) is used to transport the first sub-stream of packets, and an alternative path (i.e., the path through node 3) is used to transport the second sub-stream of packets. As those who are skilled in the art will appreciate, source node 211 could have specified two other network paths to transport initially the stream of packets in the example.

As node 211 evaluates both network paths, it determines that the quality of service of the nominal path has become unsatisfactory, at which point source 211 can respond in one of the following ways, though not limited to the following:

i. stop transmitting via the nominal path;
    ii. change the encoding used on the (second) sub-stream that is transmitted on the alternative path;
    iii. transmit both the first sub-stream and the second sub-stream on the alternative path; or
    iv. performing a combination of i, ii, and iii.

For illustrative purposes, FIG. 7 in the context of the second illustrative sequence depicts the result of node 211 (i) having stopped transmitting on the nominal path and (ii) having changed the encoding of the second sub-stream. Node 211 has changed the encoding to improve the quality of the reconstruction at decoder 305, as only the stream of packets on the alternative path is available to the decoder.

Figure 8:
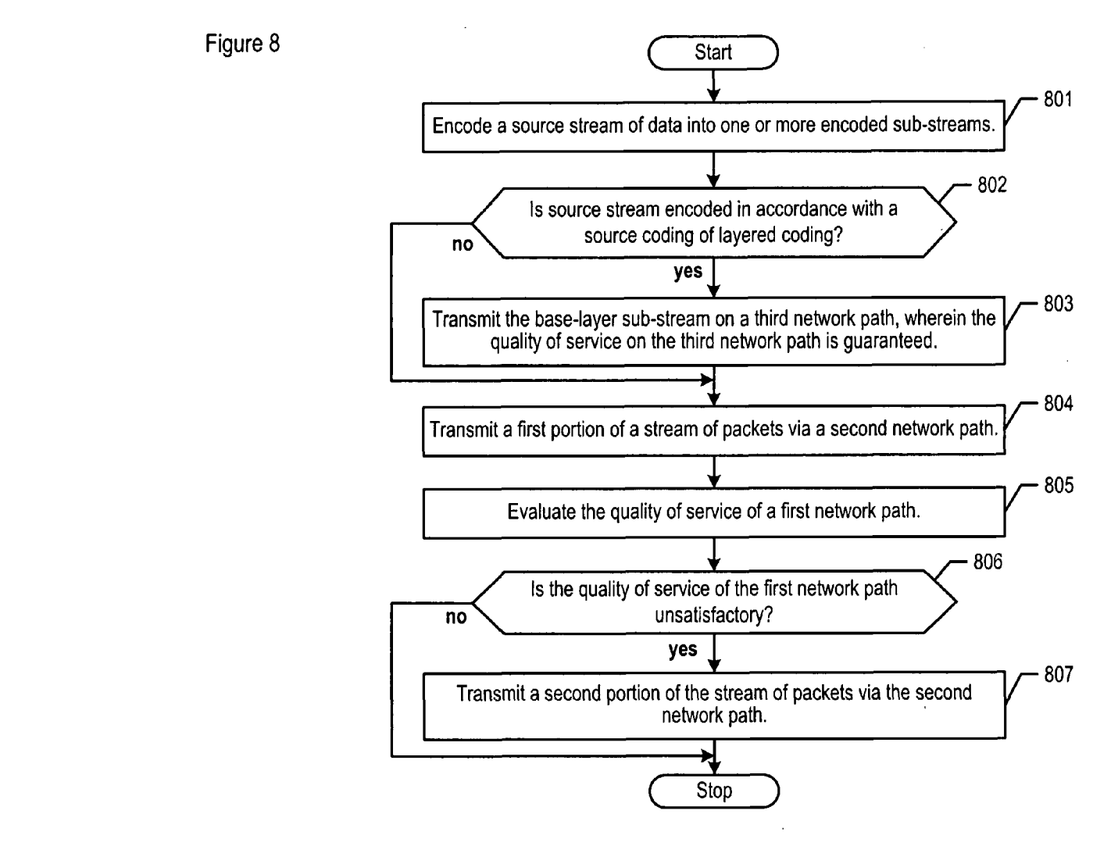
FIG. 8 depicts a first flowchart of the salient tasks associated with transmitting a stream of packets, in accordance with the illustrative embodiment of the present invention.

FIG. 8 depicts a first flowchart of the salient tasks associated with transmitting a stream of packets, in accordance with the illustrative embodiment of the present invention. In the example depicted in FIG. 8, source node 211 performs some or all of the tasks depicted, in transmitting a stream of packets to destination node 222. As those who are skilled in the art will appreciate, in some alternative embodiments, a node other than source node 211 can perform some or all of the tasks depicted. Furthermore, as those who are skilled in the art will appreciate, some of the tasks that appear in FIG. 8 can be executed in a different order than the order depicted.

At task 801, node 211 encodes a source stream of data into one or more encoded sub-streams. Node 211 can use, for example, multi-descriptive coding, layered coding, single-stream coding such as G.711, and so forth.

At task 802, if the source stream is encoded in accordance with layered coding, then task execution proceeds to task 803. If not, task execution proceeds to task 804.

At task 803, node 211 transmits one or more packets from the base-layer sub-stream on a network path that has a guaranteed quality of service, such as through network 202. This is to ensure that critical packets are transmitted reliably.

At task 804, node 211 transmits a first portion of a stream of packets via a second network path that differs from a first network path, such as the alternative path described with respect to FIGS. 6 and 7. The first portion consists of one or more of the encoded sub-streams. Node 211 might be also transmitting packets concurrently via the first network path, such as the nominal path described with respect to FIG. 5.

At task 805, node 211 evaluates the quality of service of one or more network paths, including the first network path. Each network path that node 211 evaluates can be either in use in the transmitting of the stream of packets or not.

At task 806, if the quality of service of the first network path is unsatisfactory, then task execution proceeds to task 807. Otherwise, task execution ends.

At task 807, node 211 transmits a second portion of the stream of packets via the second network path. Task execution then ends.

Figure 9:
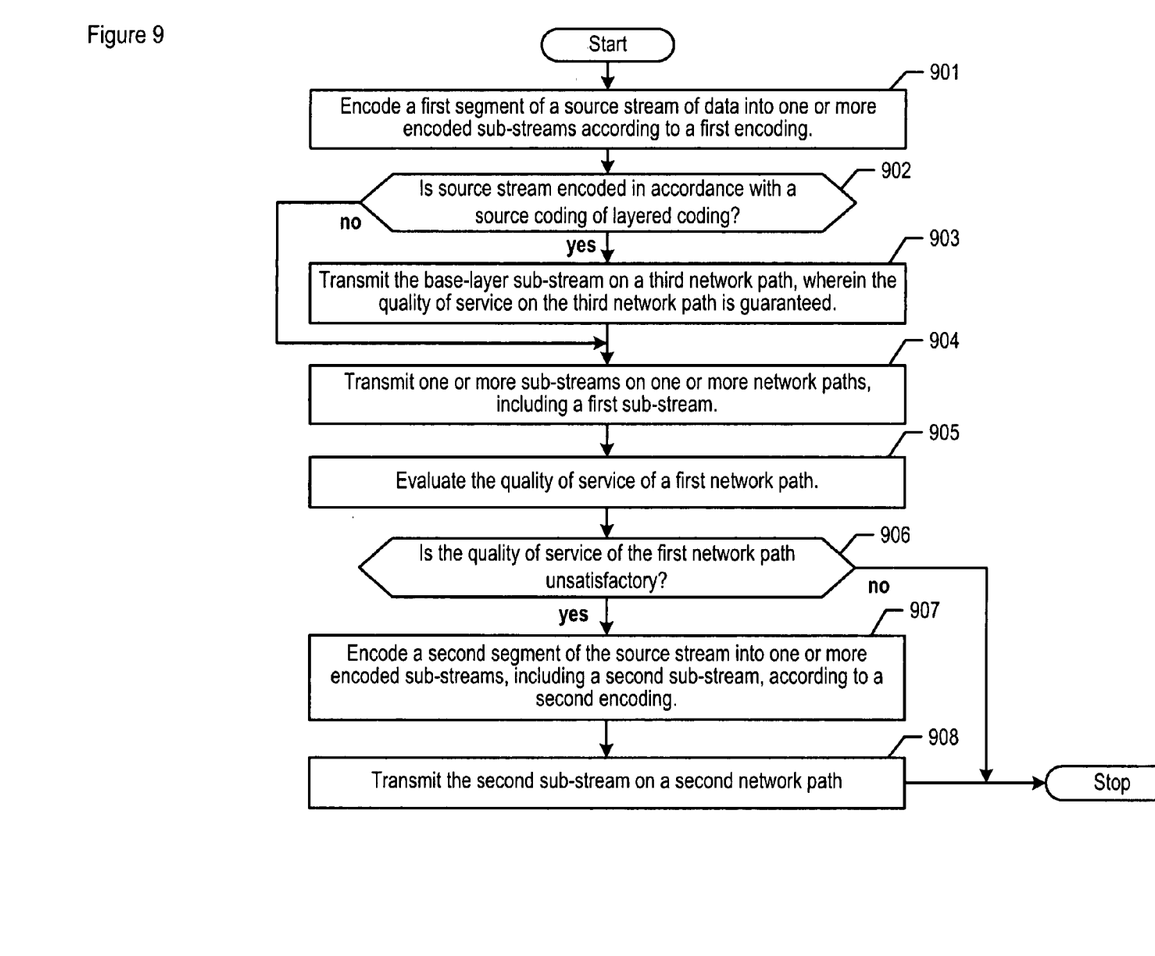
FIG. 9 depicts a second flowchart of the salient tasks associated with transmitting a stream of packets, in accordance with the illustrative embodiment of the present invention.

FIG. 9 depicts a second flowchart of the salient tasks associated with transmitting a stream of packets, in accordance with the illustrative embodiment of the present invention. As in the example depicted in FIG. 8, source node 211 performs some or all of the tasks depicted in FIG. 9, in transmitting a stream of packets to destination node 222. As those who are skilled in the art will appreciate, in some alternative embodiments, a node other than source node 211 can perform some or all of the tasks depicted. Furthermore, as those who are skilled in the art will appreciate, some of the tasks that appear in FIG. 8 can be executed in a different order than the order depicted.

At task 901, node 211 encodes a first segment of a source stream of data into one or more encoded sub-streams. Node 211 can use, for example, multi-descriptive coding, layered coding, single-stream coding such as G.711, and so forth.

At task 902, if the source stream is encoded in accordance with layered coding, then task execution proceeds to task 903. If not, task execution proceeds to task 904.

At task 903, node 211 transmits one or more packets from the base-layer sub-stream on a network path that has a guaranteed quality of service, such as through network 202. This is to ensure that critical packets are transmitted reliably.

At task 904, node 211 transmits one or more of the sub-streams encoded at task 901, including a first sub-stream, via one or more network paths, such as the paths described with respect to FIGS. 5, 6, and 7.

At task 905, node 211 evaluates the quality of service of one or more network paths, including a first network path. Each network path that node 211 evaluates can be either in use in the transmitting of the stream of packets or not.

At task 906, if the quality of service of the first network path is unsatisfactory, then task execution proceeds to task 907. Otherwise, task execution ends.

At task 907, node 211 encodes a second segment of the source stream of data into one or more encoded sub-streams. Node 211 can use, for example, multi-descriptive coding, layered coding, single-stream coding such as G.711, and so forth. In accordance with the illustrative embodiment, the encoding technique used at task 907 can be different from the encoding technique used at task 901.

At task 908, node 211 transmits one or more of the sub-streams encoded at task 907, including a second sub-stream, via one or more network paths, including a second network path that differs from the first network path. Task execution then ends.

It is to be understood that the above-described embodiments are merely illustrative of the present invention and that many variations of the above-described embodiments can be devised by those skilled in the art without departing from the scope of the invention. For example, in this Specification, numerous specific details are provided in order to provide a thorough description and understanding of the illustrative embodiments of the present invention. Those skilled in the art will recognize, however, that the invention can be practiced without one or more of those details, or with other methods, materials, components, etc.

Furthermore, in some instances, well-known structures, materials, or operations are not shown or described in detail to avoid obscuring aspects of the illustrative embodiments. It is understood that the various embodiments shown in the Figures are illustrative, and are not necessarily drawn to scale. Reference throughout the specification to "one embodiment" or "an embodiment" or "some embodiments" means that a particular feature, structure, material, or characteristic described in connection with the embodiment(s) is included in at least one embodiment of the present invention, but not necessarily all embodiments. Consequently, the appearances of the phrase "in one embodiment," "in an embodiment," or "in some embodiments" in various places throughout the Specification are not necessarily all referring to the same embodiment. Furthermore, the particular features, structures, materials, or characteristics can be combined in any suitable manner in one or more embodiments. It is therefore intended that such variations be included within the scope of the following claims and their equivalents. A computer-readable storage medium or device expressly excludes transitory signals per se and transitory mediums such as carrier waves, wires, cables, fiber optics, infrared media, and the like.

What is claimed is:

1. A method comprising:
encoding, at a first node via a processor, a source stream of data packets into a first stream using a first protocol having a first encoded data rate;
transmitting, at a first time, the first stream from the first node to a second node over a first network path between the first node and the second node;
in response to a decrease in a quality-of-service associated with the first network path at a second time later than the first time, encoding, at the first node, the source stream of data packets into a first sub-stream and a second sub-stream using a second encoding protocol having a second encoded data rate lower than the first encoded data rate;
identifying an intermediate node whose inclusion in a network path provides a known quality of service, wherein the intermediate node is located between the first node and the second node and the first network path does not traverse the intermediate node;
transmitting, from the first node to the second node, the first sub-stream over the first network path and the second sub-stream over a second network path that connects the first node and the second node via the intermediate node, wherein the second sub-stream is combined with a third sub-stream to improve a quality of a content of the second sub-stream, and wherein the third sub-stream is encoded from the source stream;
in response to a further decrease in the quality-of-service associated with the first network path at a third time later than the second time, encoding, at the first node, the source stream of data packets into a second stream using the first protocol having the first encoded data rate; and
transmitting the second data stream from the first node to the second node over the second network path.

2. The method of claim 1, wherein the source stream is encoded in accordance with a layered coding.

3. The method of claim 1, wherein the second encoded data rate is half the first encoded data rate.

4. The method of claim 1, further comprising transmitting the first sub-stream and the second sub-stream on the second network path.

5. The method of claim 1, further comprising transmitting the first sub-stream on the first network path when the quality of service of the first network path is satisfactory.

6. The method of claim 1, wherein the first encoding protocol is a G.711 protocol, and wherein the second encoding protocol is a G.726 protocol.

7. The method of claim 1, wherein each of the first sub-stream and the second sub-stream is configured to guarantee a basic level of reconstruction quality, and wherein combining the first sub-stream and the second sub-stream improves the reconstruction quality.

8. The method of claim 1, wherein the first node is a source of the source stream of data packets and the second node is a destination of the source stream of data packets.

9. The method of claim 1, further comprising:
receiving, at the first node, the source stream of data packets from a source node.

10. The method of claim 1, wherein at least one of the decrease in the quality-of-service or the further decrease in the quality-of-service is determined by a node other than the first node.

11. The method of claim 1, wherein the decrease in the quality-of-service and the further decrease in the quality-of-service are measured by at least one of bandwidth, error rate, latency, a derivative or associated function of bandwidth, a derivative or associated function of error rate, or a derivative or associated function of latency.

12. The method of claim 1, wherein the second encoding protocol features an adaptive differential pulse code modulation, and wherein the first encoded data rate is 64 kilobits per second and the second encoded data rate is 32 kilobits per second.

13. A system comprising:
a processor; and
a computer-readable storage medium storing instructions which, when executed by the processor, cause the processor to perform operations comprising:
  encoding, at a first node, a source stream of data packets into a first stream using a first protocol having a first encoded data rate;
  transmitting, at a first time, the first stream from the first node to a second node over a first network path between the first node and the second node;
  in response to a decrease in quality of-service associated with the first network path at a second time later than the first time, encoding, at the first node, the source stream of data packets into a first sub-stream and a second sub-stream using a second encoding protocol having a second encoded data rate lower than the first encoded data rate;
  identifying an intermediate node whose inclusion in a network path provides a known quality of service, wherein the intermediate node is located between the first node and the second node and the first network path does not traverse the intermediate node;
  transmitting, from the first node to the second node, the first sub-stream over the first network path and of the second sub-stream over a second network path that connects the first node and the second node via the intermediate node, wherein the second sub-stream is combined with a third sub-stream to improve a quality of a content of the second sub-stream, and wherein the third sub-stream is encoded from the source stream;
  in response to a further decrease in the quality-of-service associated with the first network path at a third time later than the second time, encoding, at the first node, the source stream of data packets into a second stream using the first protocol having the first encoded data rate; and
  transmitting the second data stream from the first node to the second node over the second network path.

14. The system of claim 13, wherein the source stream is encoded in accordance with a layered coding.

15. The system of claim 13, wherein the second encoded data rate is half the first encoded data rate.

16. The system of claim 13, the computer-readable storage medium storing additional instructions which, when executed by the processor, cause the processor to perform further operations comprising:
  transmitting the first sub-stream and the second sub-stream over the second network path.

17. A computer-readable storage device storing instructions which, when executed by a processor, cause the processor to perform operations comprising:
  encoding, at a first node, a source stream of data packets into a first stream using a first protocol having a first encoded data rate;
  transmitting, at a first time, the first stream from the first node to a second node over a first network path between the first node and the second node;
  in response to a decrease in quality of-service associated with the first network path at a second time later than the first time, encoding, at the first node, the source stream of data packets into a first sub-stream and a second sub-stream using a second encoding protocol having a second encoded data rate lower than the first encoded data rate;
  identifying an intermediate node whose inclusion in a network path provides a known quality of service, wherein the intermediate node is located between the first node and the second node and the first network path does not traverse the intermediate node;
  transmitting, from the first node to the second node, the first sub-stream over the first network path and the second sub-stream over a second network path that connects the first node and the second node via the intermediate node, wherein the second sub-stream is combined with a third sub-stream to improve a quality of a content of the second sub-stream, and wherein the third sub-stream is encoded from the source stream;
  in response to a further decrease in the quality-of-service associated with the first network path at a third time later than the second time, encoding, at the first node, the source stream of data packets into a second stream using the first protocol having the first encoded data rate; and
  transmitting the second data stream from the first node to the second node over the second network path.

18. The computer-readable storage device of claim 17, wherein the first encoding protocol is a G.711 protocol, and wherein the second encoding protocol is a G.726 protocol.

19. The computer-readable storage device of claim 17, wherein at least one of the decrease in the quality-of-service or the further decrease in the quality-of-service is determined by a node other than the first node.

* * * * *